Feb. 15, 1966     S. MYERS ETAL     3,235,778
CAPACITOR PROTECTION APPARATUS
Filed Aug. 26, 1963

INVENTORS
STANWOOD MYERS
THEODORE R. KENNEDY
BY
Arthur H. Seidel
ATTORNEY

United States Patent Office 3,235,778
Patented Feb. 15, 1966

3,235,778
CAPACITOR PROTECTION APPARATUS
Stanwood Myers, Trenton, and Theodore R. Kennedy, Levittown, N.J., assignors to Inductotherm Corporation, Rancocas, N.J., a corporation of New Jersey
Filed Aug. 26, 1963, Ser. No. 304,516
8 Claims. (Cl. 317—256)

In general, this invention relates to a new and improved method of protecting capacitors and more particularly to the protection of large capacitors such as would be utilized in power factor correction of high power inductive frequency multipliers.

When a small capacitor is switched to a large bank of charged capacitors such as would occur in varying the power factor of an inductive type frequency tripling circuit, the transient current in the small capacitor is extremely large. Thus several thousand amperes may pass through the capacitor during the initial transient. When a capacitor fails, the sputtering failure current is often limited by the power source or the nature of this short circuit to one or two thousand amperes. Thus, it is necessary to develop a fuse for a capacitor which will withstand the large transient currents and yet protect the system against capacitor failure.

A thermal fuse to protect the capacitor is intended to clear the circuit before the capacitor is damaged or before the source of power is damaged. This type of fuse must have a thermal content at the blow point less than the damage point of the circuit elements it protects.

Over many years, it has been observed that capacitors in induction heating service have failed not because of overload with associated general excess temperature, but by sudden, unpredictable failure of a very small area of the capacitor dielectric. Although the failure of the dielectric results in an arc and a nominal short circuit, the nature of the construction of many capacitors is such that the fault current is less than the rating of the fuse that would be chosen to carry the normal current to the capacitor. A small fault of this kind can persist long enough to decompose sufficient dielectric material to create disruptive gas pressures. Since, at the same time, the majority of the capacitors used for induction heating are water cooled, the general temperature of the faulty capacitor may not have risen to any marked extent. Unless monitored with sensitive equipment, the fault may exist unobserved until pressure finally destroys the capacitor. The explosion of a capacitor may in turn cause further damage and disturbance to associated circuits and structures.

The fact that capacitors have failed and exploded even when nominally protected by a properly rated normal fuse, indicates that unless the capacitor units are made of relatively low volt-ampere ratings, fuse protection of the thermal or overcurrent type is very unsatisfactory. In induction heating work, capacitor banks aggregating fifteen thousand kVAR and over on a single furnace are not uncommon. A single capacitor unit for this work will be rated at three hundred kVAR in a single case. Thus, a large induction unit might employ twenty-five, fifty or even a hundred capacitors requiring protection. The prior art utilized pressure devices to activate switches to open or close a control circuit for each capacitor. Such extensive control wiring is both cumbersome and extremely expensive.

As noted, the heat and current in a capacitor fault may be small compared to the size of the unit. Accumulated pressure in a hermetically sealed container is the essential danger. A faulty capacitor may or may not be made serviceable depending upon construction, but it must be removed from the source of power as soon as possible after the fault occurs. Further, an indication must be given as to the particular capacitor faulted.

Therefore, it is the general object of this invention to avoid and overcome the foregoing and other difficulties of prior art practices by the provision of a new and better capacitor protection apparatus.

Another object is the provision of better capacitor protection by utilizing apparatus responsive to the pressure within the capacitor.

Still another object of this invention is to provide capacitor protection apparatus which can be used with a plurality of capacitors and only one fault detection circuit.

A further object of this invention is to provide a new and better capacitor fault detector capable of utilization with an unlimited number of capacitors with a single fault detection circuit and means for indicating which capacitor has faulted.

Other objects will appear hereinafter.

For the purpose of illustrating the invention, there are shown in the drawings forms which are presently preferred; it being understood, however, that this invention is not limited to the precise arrangements and instrumentalities shown.

Figure 1:
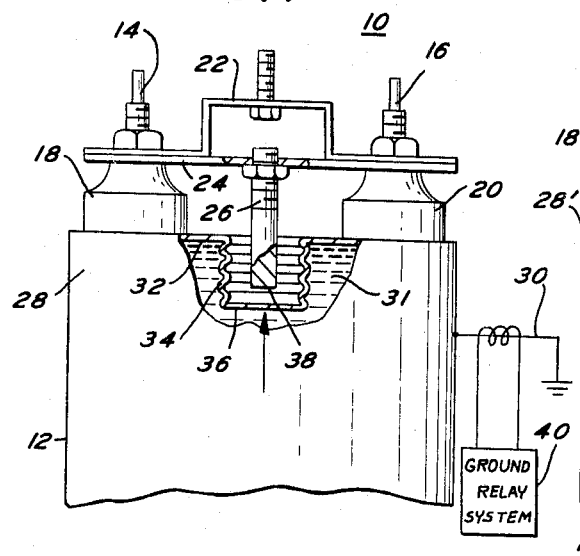
FIGURE 1 is a partially broken away view of one embodiment of a capacitor built in accordance with the principles of the present invention.

In FIGURE 1, there is shown capacitor protective apparatus built in accordance with the principles of the present invention and generally designated by the numeral 10.

The apparatus 10 includes a capacitor 12 having a pair of input terminals 14 and 16 mounted on suitable insulating bushings 18 and 20 respectively. The terminals 14 and 16 are joined to a common stud assembly 22. The stud assembly 22 includes a conducting cross brace 24 extending between terminals 14 and 16. Threadably mounted on the cross brace 24 is a vertically adjustable conducting rod member 26.

The capacitor 12 has an outer metal casing 28 which is conductive and grounded to a suitable ground circuit 30. The ground circuit 30 is common to a plurality of capacitors which make up the capacitor bank (not shown). Thus, the capacitor 12 has a common ground with the remainder of the capacitors in the bank.

Within the capacitor casing 28 there is an insulating oil such as Askarel 31. On the top wall 32 of the capacitor 12 there are mounted the insulating bushings 18 and 20. Further, in the center of the top wall 32 there is formed a metallic bellows 34. The bellows 34 is manufactured of a material compatible with the Askarel 31. Copper alloys are not satisfactory for this purpose unless they have a heavy nickel, chrome, or tin plating such materials being compatible with Askarel. The bellows is shown as manufactured of the same material as the metal casing 28 but could be a separate bellows which had been hermetically sealed to the top wall 32 such as by soldering.

The bellows 34 is concentric with the vertically adjustable conducting rod member 26 and the bellows bottom end 36 is spaced from the bottom end 38 of the conducting rod member. The space between the bellows bottom end 36 and the conducting rod bottom end 38 is adjustable by means of a screw threaded engagement between the rod 26 and the conducting cross brace 24.

The ground circuit 30 includes a single circuit ground relay system that detects a ground in any of the capacitors in the bank. The ground relay system is generally designated by the numeral 40.

As the result of a fault in the capacitor 12, the oil pressure in the capacitor will start to rise. Abnormal pressure within the casing 28 causes the bellows 34 to compress and contact is made between the conducting bellows bottom end 36 and the conducting rod bottom end 38. This results in a circuit ground which is detected by the ground relay system 40. This relay system removes power from the bank of capacitors. After this, the faulty capacitor is located and disconnected.

The rise of internal pressure due to an arcing fault has thus been directed to cause a circuit ground which can be simply detected by a single ground indicating device normally monitoring an induction heating circuit. The metallic bellows 34 sealed into the metallic capacitor case 28 senses a degree of pressure much less than the disruptive strength of the case 28 and substantially greater than the normal internal operating pressure of the insulating oil 31. Bursting pressure of the case 28 may be of the order of fifteen pounds per square inch, operating pressure approximately two pounds per square inch, with the bellows bottom end 36 contacting the conducting rod bottom end 38 at approximately six pounds per square inch. In one practical embodiment of the present invention, utilizing a one inch diameter bellows having a one and a half inch length, an oil pressure increase from zero to five pounds per square inch compressed the bellows a minimum of .25 inch. Thus it can be seen that this movement of the bellows is considerable, and the point at which the fault is detected can be varied by varying the adjustable rod member bottom end 38 with respect to the bellows bottom end 36.

Figure 2:
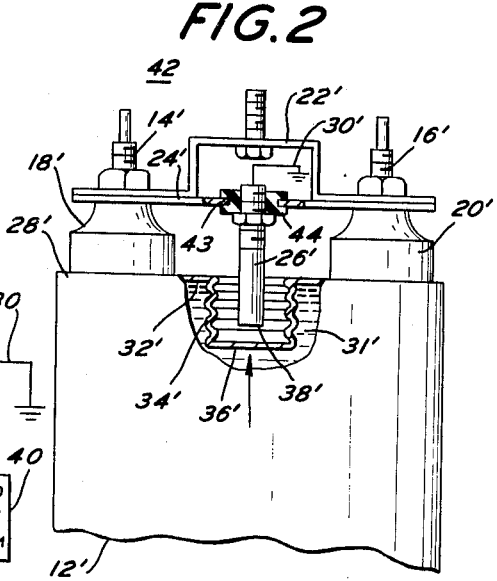
FIGURE 2 is partially broken away view of a second embodiment of the present invention.

In FIGURE 2, there is shown capacitor protective apparatus built in accordance with the principles of the present invention and generally designated by the numeral 42 for capacitor containers which are ungrounded. In this case, a capacitor 12' is utilized having a metallic casing 28' which is not grounded. The input terminals 14' and 16' of the capacitor 12' are connected through a common stud assembly 22' and have a common cross brace 24'.

The capacitor 12' has a top wall 32' on which insulating bushings 18' and 20' are located. Centrally of the top wall 32' is a metallic bellows 34' having a bottom end 36'. The capacitor 12' is exactly similar to the capacitor 12 shown in FIGURE 1 except that the casing 28' is not grounded.

The cross brace 24' has an enlarged opening 43 at the center thereof through which passes an insulating bushing 44. Mounted within the insulating bushing 44 is an adjustable conducting rod member 26' having a bottom end 38'. The conducting rod member 26' is connected to a common ground circuit 30' of the bank of capacitors.

Thus, when the container 28' of the capacitor 12' is connected as a terminal of the electrical system as occurs in many internally water-cooled units, the adjustable member 26' being supported by insulator 44 and connected to a ground bus 30' will provide the ground indication necessary should the conducting member bottom end 38' come in contact with the bellows bottom end 36' due to an increase in the oil 31' pressure within the casing 28'. The single ground relay system 40 shown in FIGURE 1 has been eliminated from the showings in FIGURES 2, 3 and 4 it being understood that such circuitry is included in the common ground circuit 30'.

Figure 3:
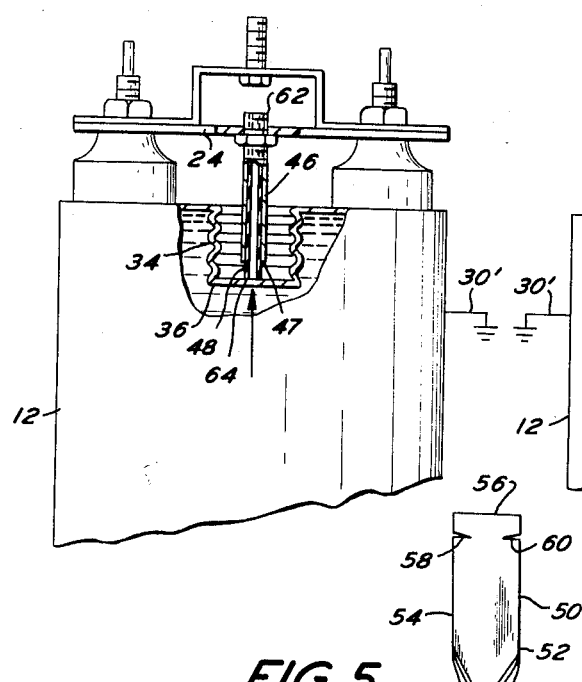
FIGURE 3 is a partially broken away view of a third embodiment of the present invention prior to faulting.
Figure 4:
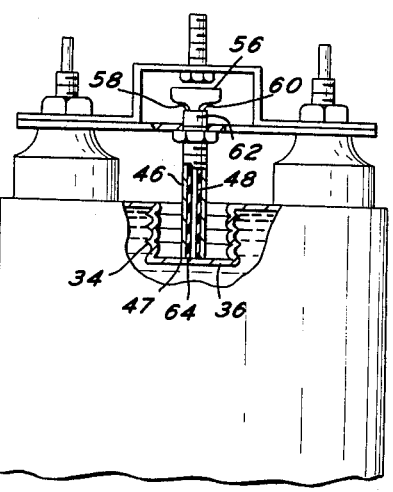
FIGURE 4 is a partially broken away view of the capacitor of FIGURE 3 after faulting.
Figure 5:
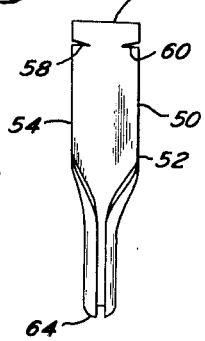
FIGURE 5 is a front view of the capacitor indicator flag utilized in the embodiments shown in FIGURES 3 and 4.

In FIGURES 3 and 4, there is shown the capacitor of FIGURE 1 with a modification of the conducting rod member 26. The conducting rod member 26 of FIGURE 1 has been eliminated and a tubular conducting rod member 46 substituted therefor. The tubular conducting rod member 46 is also screw adjustable with respect to cross brace 24. The tubular conducting rod member 46 has a bottom end 47 which will short circuit the capacitor and provide a ground circuit 30 fault current should bellows 34 bottom end 36 contact it.

Within the tubular conducting rod member 46 there is provided a tube of flexible insulating material 48 which will act as a flare to indicate a faulty capacitor. The tubular insulating member 48 may be formed of Mylar and is preferably red in color to indicate a fault.

The tubular member 48 is initially formed from a flat sheet 50 which has its side edges 52 and 54 rolled inwardly to form a tube with a longitudinally extending slot therein. At the front or top end 56 of the sheet 50 there are provided side notches 58 and 60 extending peripherally inwardly from side edges 54 and 52 respectively. When installing the sheet 50 within the tubular conducting rod member 46, the front or top end 56 is inserted first into the lower end 47 of the tubular conducting rod member 46 and pushed upwardly until top end 56 is flush with the top end 62 of conducting rod member 46.

The lower end 64 of tube 48 abuts the bottom end 36 of the bellows 34. Thus, as shown in FIGURE 3, in this position, no indication is given of a fault in the capacitor 12.

The distance between the top end 56 of the sheet 50 and the notches 58 and 60 is set equal to the distance between conducting end 47 and bellows bottom end 36. Thus, as bellows bottom end compresses due to increased pressure within the capacitor 12, the insulating tube 48 will rise upwardly and extend above the upper end 62 of the tubular conducting rod member 46.

As shown in FIGURE 4, when a fault has occurred and the conducting bottom end 36 of bellows 34 touches bottom end 47 of conducting tubular rod member 46 a fault current is detected in the ground circuit 30'. This tells the operator that there is a faulty capacitor in the bank of capacitors connected to the ground circuit 30.

Additionally, the bottom end 64 of the tube of flexible insulating material 48 which acts as the individual capacitor indicator means is forced upwardly and flush with the conducting tubular rod member 46 bottom end 47. When this occurs, the notches 58 and 60 will have cleared the top end 62 of tubular rod member 46 and opened the sheet 50 between the notches 58 and 60 and the top end 56 to form a red indicator that a fault has occurred in the capacitor 12.

Thus, in a simple and easy manner the operator has been given an indication that there is a faulty capacitor in a bank of capacitors, and by merely looking for a red flare associated with a particular capacitor, he can determine which capacitor has faulted out.

In a bank of more than a very few units, this saves a great deal of wiring complications which would occur if separate control circuits were arranged for each capacitor. One single circuit ground relay system thus protects a substantially unlimited number of capacitors.

The present invention may be embodied in other specific forms without departing from the spirit or essential attributes thereof and, accordingly, reference should be made to the appended claims, rather than to the foregoing specification as indicating the scope of the invention.

We claim:

1. Capacitor protection apparatus comprising a casing, insulating dielectric material in said casing, pressure responsive means responsive to the pressure of said dielectric material against said casing, terminal means for receiving electric current supplied to said capacitor, said pressure responsive means being operative to control the supply of electric current to said terminal means when the pressure of said dielectric material against said casing exceeds a predetermined value, said pressure responsive means including a bellows integral with a wall of said casing, said casing being an electrically conductive material, said bellows being operative when the pressure of said dielectric material against said casing exceeds the predetermined value to connect said terminal means to a ground terminal on said casing.

2. Capacitor protection apparatus comprising a casing, insulating dielectric material in said casing, pressure responsive means responsive to the pressure of said dielectric material against said casing, terminal means for receiving electric current supplied to said capacitor, said pressure responsive means being operative to control the supply of current to said terminal means when the pressure of said dielectric material against said casing exceeds a predetermined value, said pressure responsive means including a bellows integral with a wall of said casing, said bellows being operative upon movement thereof after the pressure of said dielectric material against said casing exceeds a predetermined value to connect said terminal means to a ground terminal, support means including an electrical insulator for supporting said ground terminal on said casing.

3. Capacitor protection apparatus comprising a casing, insulating dielectric material in said casing, pressure responsive means responsive to the pressure of said dielectric material against said casing, terminal means for receiving electric current supplied to said capacitor, said pressure responsive means including a bellows forming a portion of a wall of said casing, said bellows being electrically conductive, an adjustable terminal mounted on said casing, said terminal being spaced from said bellows, said bellows being operative upon an increase in pressure of said dielectric material against said casing to move toward said adjustable terminal and make contact with said terminal when the pressure of said dielectric material agains said casing exceeds a predetermined value.

4. The capacitor protection apparatus of claim 3 wherein said adjustable terminal is a tubular member, a non-conductive flare mounted within said tubular member, said non-conductive flare having one end abutting a movable portion of said bellows.

5. The capacitor protection apparatus of claim 4 wherein said non-conducting flare is a tube having a longitudinal slot along the length thereof, said flare tube having peripheral notches extending from said longitudinal slot spaced from the end of said flare tube opposite from said one end, said bellows being operative when the pressure of said dielectric material against the casing exceeds a predetermined value to come into electrically conducting relation with said conducting terminal, said bellows in said last mentioned position being operative to move said flare tube so that the portion of said flare tube from said notches toward the end of said flare tube opposite from said one end is outside of said conducting terminal.

6. Capacitor protection apparatus comprising a casing, insulating dielectric material in said casing, pressure responsive means responsive to the pressure of said dielectric material against said casing, terminal means for receiving electric current supplied to said capacitor, said pressure responsive means being operative to control the supply of electric current to said terminal means when the pressure of said dielectric material against said casing exceeds a predetermined value, a grounding circuit connected to said capacitor, a detection circuit connected to said grounding circuit to detect abnormal currents in said ground circuit, said pressure responsive means being operative when the pressure of said dielectric material against said casing exceeds a predetermined value to cause an abnormal current to flow in said ground circuit.

7. Capacitor protection apparatus comprising a casing, pressure responsive means responsive to the pressure of said dielectric material against said casing, terminal means for receiving electric current supplied to said capacitor, said casing being a terminal for supplying electric current to said capacitor, said pressure responsive means including a bellows forming a portion of one wall of said casing, a terminal insulated from and mounted on said one wall of said casing, said bellows being electrically conductive, said bellows being operative to move toward and to contact said terminal as the pressure of said dielectric material against said casing rises toward and then exceeds a predetermined value.

8. Capacitor protection apparatus comprising a casing, insulating dielectric material in said casing, pressure responsive means responsive to the pressure of said dielectric material against said casing, terminal means for receiving electric current supplied to said capacitor, said casing being electrically conductive, second terminal means electrically connected to said casing, said pressure responsive means including a bellows forming a portion of one wall of said casing and being in electrically conductive relation therewith, said bellows being operative when the pressure of said dielectric material against said casing exceeds a predetermined value to contact said first-mentioned terminal means and connect said first-mentioned terminal means to said second terminal means.

References Cited by the Examiner

UNITED STATES PATENTS

| | | | |
|---|---|---|---|
| 1,931,455 | 10/1933 | Clark | 174—17 |
| 2,274,388 | 2/1942 | Venable | 174—11 |
| 2,547,526 | 4/1951 | Hilliard | 340—244 |
| 2,768,261 | 10/1956 | Mathisen | 200—83 |

FOREIGN PATENTS

| | | |
|---|---|---|
| 1,298,073 | 5/1962 | France. |

JOHN F. BURNS, *Primary Examiner.*